United States Patent [19]
Esmersoy

[11] Patent Number: 5,808,963
[45] Date of Patent: Sep. 15, 1998

[54] DIPOLE SHEAR ANISOTROPY LOGGING

[75] Inventor: Cengiz Esmersoy, Sugar Land, Tex.

[73] Assignee: Schlumberger Technology Corporation, Ridgefield, Conn.

[21] Appl. No.: 789,906

[22] Filed: Jan. 29, 1997

[51] Int. Cl.[6] .................................................. G01V 1/40
[52] U.S. Cl. ............................. 367/31; 367/73; 364/422
[58] Field of Search ............................... 367/31, 73, 75, 367/57; 364/422

[56] References Cited

U.S. PATENT DOCUMENTS

| | | | |
|---|---|---|---|
| 4,648,039 | 3/1987 | Devaney et al. | 364/421 |
| 4,809,239 | 2/1989 | Esmersoy | 367/57 |
| 5,077,697 | 12/1991 | Chang | 367/31 |
| 5,214,613 | 5/1993 | Esmersoy | 367/31 |
| 5,278,805 | 1/1994 | Kimball | 367/32 |
| 5,610,875 | 3/1997 | Gaiser | 367/75 |

OTHER PUBLICATIONS

S. Crampin, Evaluation of Anisotrophy by Shear–Wave Splitting: Geophysics, 50, 142–152, 1985.

C. Esmersoy, Dipole Shear Anisotrophy Logging, 10th Petroleum Congress of Turkey, Expanded Abstracts, 1994.

C. Esmersoy, K. Koster, M. Williams, A. Boyd, and M. Kane, Dipole Shear Anisotropy Logging: 64th Ann. Internat. Mtg., Soc. Explor. Geophys., Expanded Abstracts, 1994.

K. Koster, M. Williams, C. Esmersoy, and J. Walsh, Applied Production Geophysics Using Shear–Wave Anisotropy: Production Applications For The Dipole Shear Imager and the Multi–component VSP, 64th Ann. Internat. Mtg., Soc. Explor. Geophys., Expanded Abstracts, 1994.

M. Mueller, A. Boyd, and C. Esmersoy, Case Studies of The Dipole Shear Anisotropy Log, 64th Ann. Internat. Mtg., Soc. Explor. Geophys., Expanded Abstracts, 1994.

C. Esmersoy, A. Boyd. M. Kane, and S. Denoo, Fracture and Stress Evaluation Using Dipole–Shear Anisotropy Logs, SPWLA, 36th Ann. Logging Symposium, paper J, 1995.

K. Ellefsen, C. Cheng, and N. Toksoz, Applications of Perturbation Theory To Acoustic Logging: J. Geophys. Res., 96, 537–549, 1991.

D. Leslie and C. Randall, Multipole Sources In Boreholes Penetrating Anisotropic Formations, J. Acoust. Soc. Am., 91, 12–27, 1992.

B. Sinha, A. Norris, and S. Chang, Borehole Flexural Modes in Anisotropic Formations, Geophysics, 59, 1994.

(List continued on next page.)

Primary Examiner—Ian J. Lobo
Attorney, Agent, or Firm—Martin M. Novack; Brigitte L. Jeffery; Keith G. W. Smith

[57] ABSTRACT

Parametric inversion is used to advantage in a technique and apparatus for borehole logging to determine properties of anisotropic formations, and a dispersion function that varies with frequency is used in the modeling of the formations. An embodiment of the method includes the following steps: providing a logging device that is moveable through the borehole; exciting a sonic source at a transmitter location on the logging device to establish flexural waves in the surrounding formations; measuring at each of a plurality of receiver locations on the logging device, which are spaced at a respective plurality of distances from the transmitter location, orthogonal wave components of split flexural waves that have travelled through the formations; computing, for each of the plurality of distances and for multiple frequencies, model orthogonal wave components which would result from the superposition of model split-flexural waves having selected wave parameters including respective fast and slow model slownesses which are variable functions of frequency and model polarizations; determining an error value which depends on the differences, at each of the plurality of receiver locations, between measured wave components and the model composite waves; modifying the model parameters; iteratively repeating the computing, determining, and modifying steps to reduce the error; and storing the ultimately modified model parameters as being indicative of properties of the formations.

20 Claims, 8 Drawing Sheets

OTHER PUBLICATIONS

R. Alford, Shear Data In The Presence Of Azimuthal Anisotropy, Dilley, Texas: 56th Ann. Internat. Mtg., Soc. Expl. Geophys., Expanded Abstracts, 1986.

Harrison et al., "Acquisition and Analysis of Socnic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990.

C. Esmersoy, Split–shear Wave Inversion for Fracture Evaluation, SEG Ann. Internat. Meeting Abstracts, pp. 1400–1403, 1990.

K. Hsu, and C. Esmersoy, Parametric Estimation of Phase and Group Slowness From Sonic Logging Waveforms, Geophysics, 57, No. 8, 978–985, 1992.

A. Kurkjian, and S. Chang, Acoustic Multipole Sources In Fluid–Filled Boreholes, Geophysics, 51,148–163, 1986.

Esmersoy, Inversion of P and SV Waves From Multicomponent Offset Vertical Seismic Profiles; Geophysics (1990).

DIPOLE SHEAR ANISOTROPY LOGGING

FIELD OF THE INVENTION

This invention relates to investigation of earth formation and, more particularly, to a method and apparatus for determining properties of anisotropic earth formations.

BACKGROUND OF THE INVENTION

It is well known that mechanical disturbances can be used to establish acoustic waves in earth formations and the properties of these waves can be measured to obtain important information about the formations through which the waves have propagated. Parameters of compressional and shear waves, such as their velocity and polarization directions, can be indicators of formation characteristics that help in evaluation of the location and/or producibility of hydrocarbon resources. Reference can be made, for example, to my U.S. Pat. Nos. 4,684,039 and 4,809,239.

Detection of fractured zones and estimation of their properties, identification of principal stress directions and stress magnitudes, and measuring intrinsic anisotropy of formations such as shales, are of great interest in exploration and production geophysics. Shear wave splitting occurs when a shear wave separates into two phases with different velocities and different polarizations. Split-shear waves are one of the main acoustic indicators of anisotropy caused by stress, oriented inclusions or intrinsic properties of rocks. Anisotropy measurements using split-shear waves have been widely used in conjunction with surface seismic and borehole seismic techniques. Reference can be made, for example, to S. Crampin, Evaluation of Anisotropy by Shear-Wave Splitting: Geophysics, 50, 142–152, 1985; and to my U.S. Pat. No. 5,214,613. In borehole seismics, a source of acoustic energy is located on the surface of the earth, near a borehole. The source may be, for example, an explosive device or vibrating device. A logging tool within the borehole is equipped with sensors, such as geophones that receive acoustic energy from the source that has propagated through the earth formations.

Shear anisotropy measurements in boreholes using dipole-shear tools (which have dipole sources as well as sensors, on the logging device) is a relatively new development. Reference can be made, for example, to C. Esmersoy, Dipole Shear Anisotropy Logging, 10th Petroleum Congress of Turkey, Expanded Abstracts, 1004; C. Esmersoy, K. Koster, M. Williams, A. Boyd, and M. Kane, Dipole Shear Anisotropy Logging: 64th Ann. Internat. Mtg., Soc. Explor. Geophys., Expanded Abstracts, 1994; K. Koster, M. Williams, C. Esmersoy, and J. Walsh, Applied Production Geophysics Using Shear-Wave Anisotropy: Production Applications For The Dipole Shear Imager and the Multicomponent VSP, 64th Ann. Internat. Mtg., Soc. Explor. Geophys., Expanded Abstracts, 1994; M. Muller, A. Boyd, and C. Esmersoy, Case Studies of The Dipole Shear Anisotropy Log, 64th Ann. Internat. Mtg., Soc. Explor. Geophys., Expanded Abstracts, 1994; and C. Esmersoy, A. Boyd. M. Kane, and S. Denoo, Fracture and Stress Evaluation Using Dipole-Shear Anisotropy Logs, SPWLA, 36th Ann. Logging Symposium, paper J, 1995. Dipole-shear measurement resembles a small-scale shear borehole seismic survey inside the borehole where dipole transducers replace the surface shear source and downhole geophones. One of the major differences between the shear seismic and dipole shear data is that the former involves non-dispersive shear body waves, and the latter is typically dominated by dispersive borehole flexural waves. [Flexural waves can be visualized as waves resulting from a part of the borehole wall flexing sideways as a consequence of the directional force exerted by a dipole source which acts through the borehole fluid.] However, in anisotropic formations the flexural waves split very much like the shear waves as illustrated in FIG. 1. [See K. Ellefsen, C. Cheng, and N. Toksoz, Applications of Perturbation Theory To Acoustic Logging: J. Geophys. Res., 96, 537–549, 1991; D. Leslie and C. Randall, Multipole Sources In Deviated Boreholes Penetrating Anisotropic Formations, J. Acoust. Soc. Am., 91, 12–27, 1992; and B. Sinha, A. Norris, and S. Chang, Borehole Flexural Modes in Anisotropic Formations, Geophysics, 59, 1037–1052, 1994.] In the Figure, 105 is an anisotropic formation traversed by a borehole with an axis 110, with a dipole source oriented at an unknown angle $\theta$ from the fast shear polarization direction u, and with $g_f$ and $g_s$ being the Green's functions representing propagation in the fast and slow shear polarization planes. The unit vectors $u_i$ and $u_c$ are the in-line and cross-component receiver signals.

A borehole seismic technique for split-shear processing is the so-called four-component rotation or "4C" technique (see R. Alford, Shear Data In The Presence Of Azimuthal Anisotropy, Dilley, Tex.: 56th Ann. Internat. Mtg., Soc. Expl. Geophys., Expanded Abstracts, 476–479, 1986). The 4C technique employs data acquired using a two-component source and an array of two-component receivers. Two-component source/receiver refers to two elements with orthogonal directions placed at the same physical location. The 4C technique has been adapted to dipole shear applications. (See C. Esmersoy, K. Koster, M. Williams, A. Boyd, and M. Kane, Dipole Shear Anisotropy Logging: 64th Ann. Internat. Mtg., Soc. Explor. Geophys., Expanded Abstracts, 1994.)

Another borehole seismic technique is parametric inversion (see U.S. Pat. No. 5,214,613 and C. Esmersoy, Split-shear Wave Inversion for Fracture Evaluation, SEG Ann. Internat. Meeting Abstracts, pp. 1400–1403, 1990), which requires one or more one-component sources and an array of two-component receivers. As described further hereinbelow (see e.g. equation (1)), the technique uses model values of fast shear and slow shear slowness that apply for all frequencies, and this is suitable for the borehole seismic application in which it is used. However, for wideband processing of split flexural waves in shear anisotropy borehole logging, the fast shear and slow shear slownesses are dispersive.

It is among the objects of the present invention to address limitations of the prior art regarding shear anisotropy borehole logging.

SUMMARY OF THE INVENTION

In the present invention, parametric inversion is used to advantage in a technique and apparatus for borehole logging to determine properties of anisotropic formations, and a dispersion function that varies with frequency is used in the modeling of the formations.

In accordance with an embodiment of the method of the invention, the following steps are performed: providing a logging device that is moveable through the borehole; exciting a sonic source at a transmitter location on the logging device to establish flexural waves in the surrounding formations; measuring at each of a plurality of receiver locations on the logging device, which are spaced at a respective plurality of distances from the transmitter location, orthogonal wave components of split flexural waves that have travelled through the formations; computing, for each of the plurality of distances and for multiple frequencies, model orthogonal wave components which would result from the superposition of model split-flexural waves having selected wave parameters including respective fast and slow model slownesses which are variable functions of frequency and model polarizations; determining an error value which depends on the differences, at each of the plurality of receiver locations, between measured wave components and the model composite waves; modifying the model parameters; iteratively repeating the computing, determining, and modifying steps to reduce the error; and storing the ultimately modified model parameters as being indicative of properties of the formations.

Further features and advantages of the invention will become more readily apparent from the following detailed description when taken in conjunction with the accompanying drawings.

DETAILED DESCRIPTION

Figure 2:
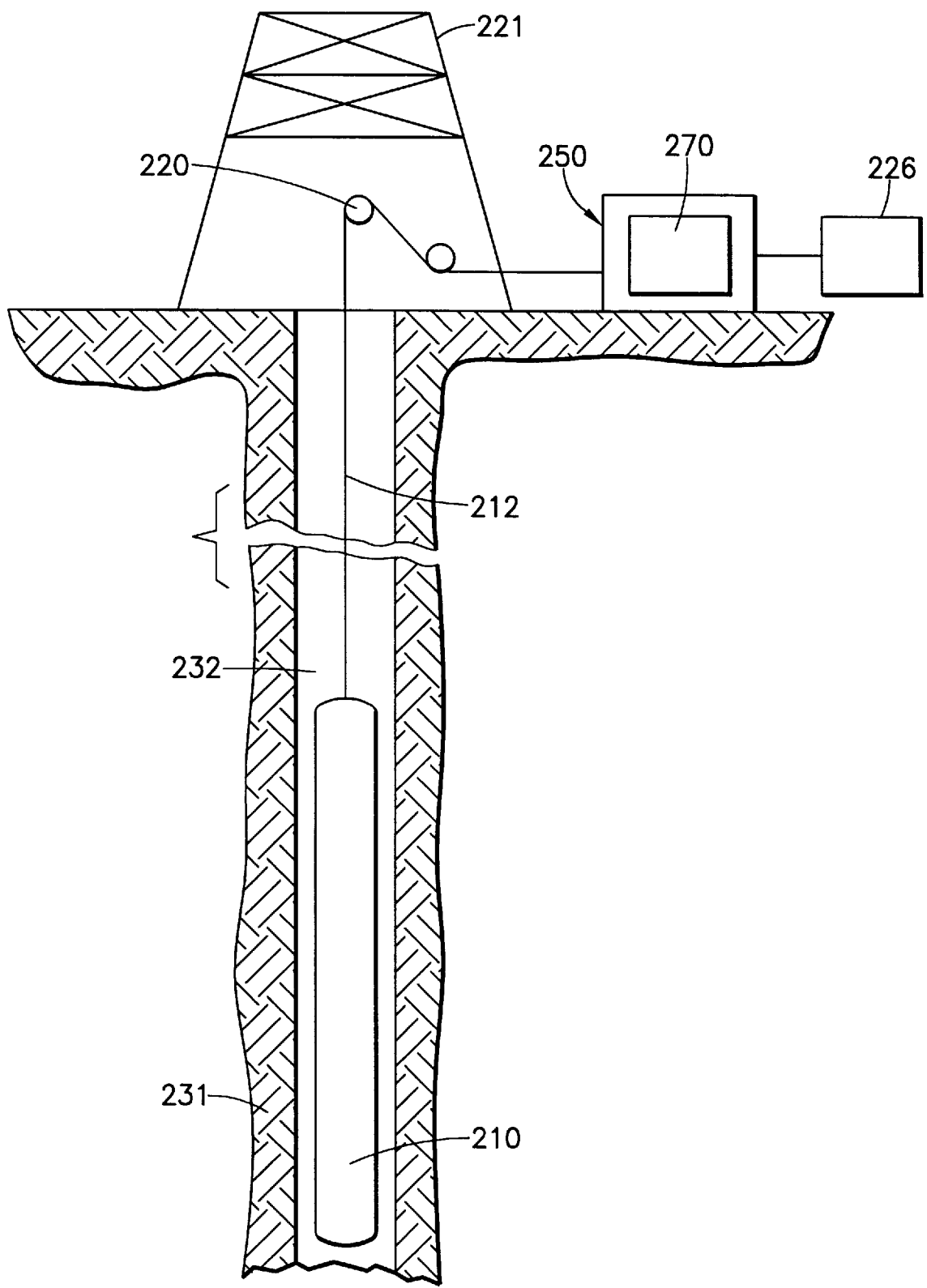
FIG. 2 is a diagram, partially in block form, of an apparatus that can be used in practicing an embodiment of the invention.

Referring to FIG. 2, there is shown an apparatus which can be used in practicing an embodiment of the invention. Subsurface formations 231 are traversed by a borehole 232 which is typically, although not necessarily, filled with drilling fluid or mud. A logging tool 210 is suspended on an armored cable 212 and may have optional centralizers (not shown). The cable 212 extends up the borehole, over a sheave wheel 220 on a derrick 221 to a winch forming part of surface equipment 250. Known depth gauging apparatus (not shown) is provided to measure cable displacement over the sheave wheel 220 and accordingly the depth of the logging tool 210 in the borehole 232. A device of a type well known in the art is included in the tool 210 to produce a signal indicative of orientation of the body of the tool 210. Processing and interface circuitry within the tool 210 amplifies, samples and digitizes the tool's information signals for transmission and communicates them to the surface equipment 250 via the cable 212. Electrical power and control signals for coordinating operation of the tool 210 are generated by the surface equipment 250 and communicated via the cable 212 to circuitry provided within the tool 210. The surface equipment includes processor 270, standard peripheral equipment (not shown), and recorder 226.

Figure 4:
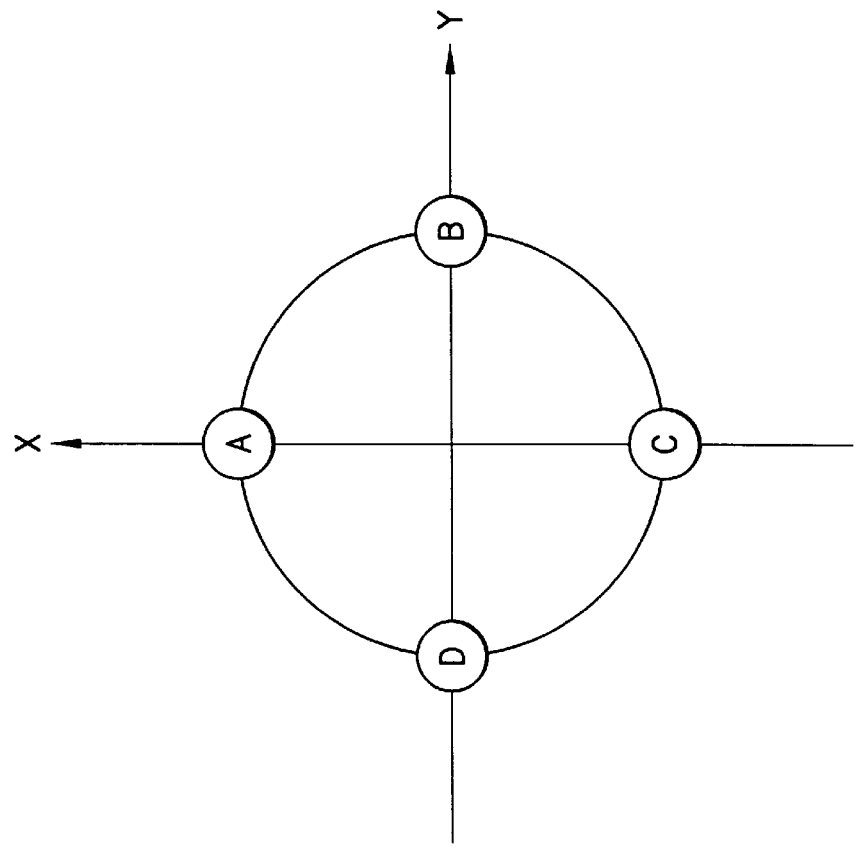
FIG. 4 is a diagram illustrating, in cross-section, the placement of hydrophones that can be used at a receiver station in the logging device of FIG. 3.
Figure 3:
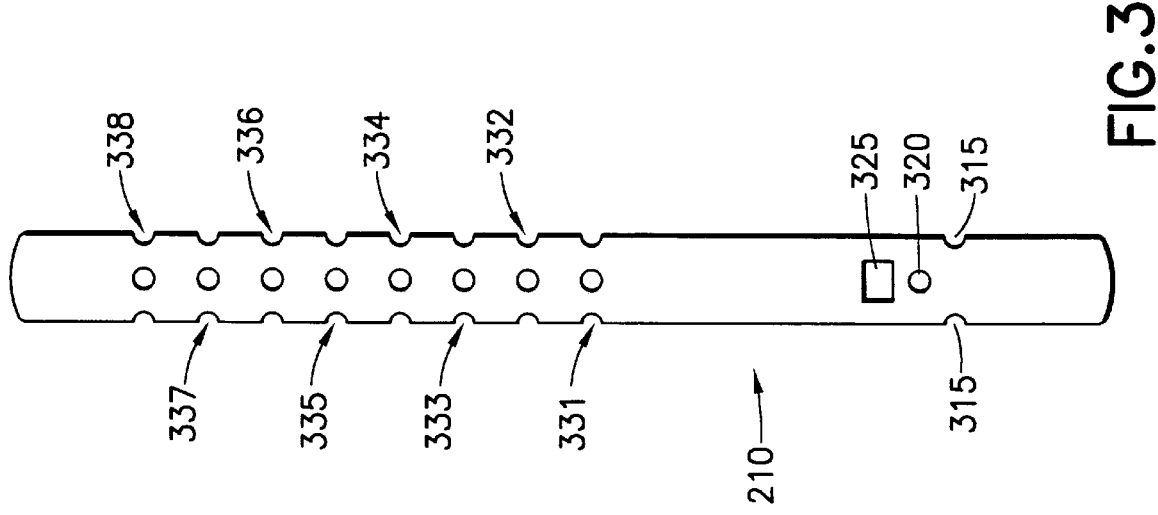
FIG. 3 is a simplified diagram of a downhole logging device that can be used in practicing an embodiment of the invention.

The logging device 210 may be, for example, a Dipole Shear Sonic Imager ("DSI"—trademark of Schlumberger) of the type described in Harrison et al., "Acquisition and Analysis of Sonic Waveforms From a Borehole Monopole and Dipole Source for the Determination of Compressional and Shear Speeds and Their Relation to Rock Mechanical Properties and Surface Seismic Data", Society of Petroleum Engineers, SPE 20557, 1990. Pertinent portions of the logging device are shown in greater detail in FIG. 3. The logging device 210 includes crossed dipole transmitters 315 and 320 (only one end of dipole 320 being visible) and a monopole transmitter 325. Eight spaced apart receiver stations, designated 331 through 338 each comprise four receiver hydrophones mounted azimuthally at ninety degree intervals in the surface of the cylindrical logging device. FIG. 4 shows the hydrophones, designated A, B, C, and D. In the example, of FIG. 4, the X component is obtained by subtracting the signals received at A and C (i.e., A–C), and the Y component is obtained by subtracting the signals received at B and D (i.e., B–D). With four receiver elements at each receiver station, there are a total of thirty two receiver elements. The receiver stations are also configurable for monopole reception.

The transmitter electronics contain a power amplifier and switching circuitry capable of driving the two crossed-dipole transmitter elements and the monopole element from a programmable waveform. Separate waveforms with appropriate shape and frequency content are used for dipole, Stoneley and compressional measurements. The receiver electronics processes the signals from the 32 individual receiver elements located at the eight receiver stations which are spaced six inches apart. At each station, four receivers are mounted as shown in FIG. 4 which allows measurement of the dipole and crossed-dipole waveforms by differencing the outputs from opposite receivers, as previously described. Summing the outputs of the receivers can be used to produce a monopole equivalent signal. As further described in Harrison et al., supra, the receiver electronics multiplexes, filters, amplifies and channels the signals from the 32 receiver elements to 8 parallel signal paths. These eight parallel analog signals are passed to an acquisition electronics cartridge where eight 12-bit analog-to-digital converters digitize the signals from the receiver electronics. The telemetry circuitry passes the digitized information to the earth's surface.

Figure 5:
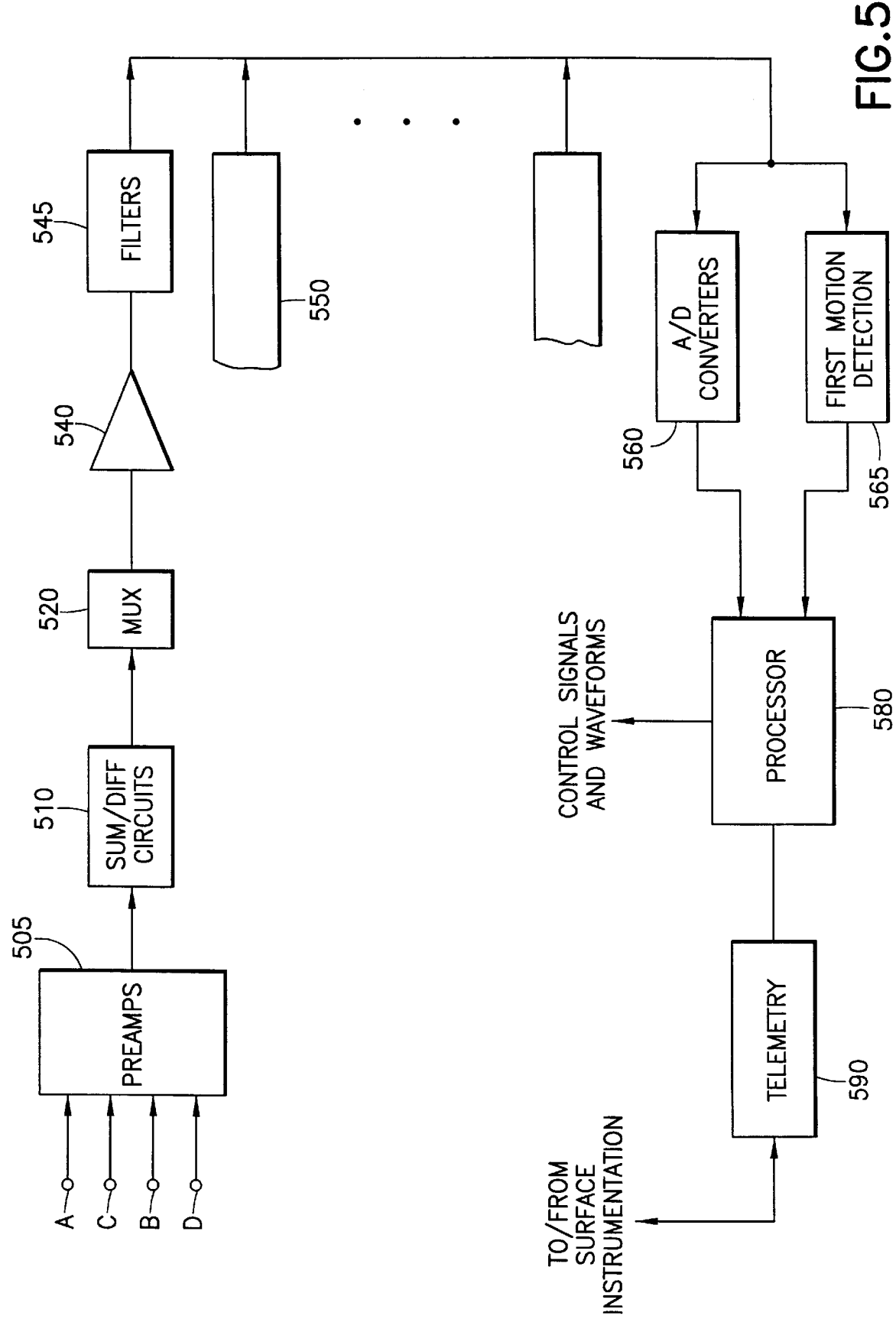
FIG. 5 is a block diagram of a portion of the electronics of the FIG. 3 logging device.

FIG. 5 shows the acquisition signal path in block diagram form for one of the eight receiver stations, as described in Harrison et al., supra. Each receiver has its own charge preamplifier (represented at 505). The output of the receivers, odd numbered pairs being in-line with the upper dipole transmitter and even numbered pairs with the lower dipole transmitter, passes into both a summing circuit (for monopole measurements) and a differencing circuit (for dipole measurements), as represented at 510. Under software control the sum or difference is selected by a multiplexer stage (block 520) and the signal passed to one of eight programmable gain amplifier stages (540) and filters (545). The other similar channels are represented by block 550. The eight parallel analog signals are passed to eight parallel 12-bit A/D converters (represented at 560) where simultaneous waveform digitization is performed. After digitization, the eight waveforms are passes to the memory section associated with downhole processor 580. The processor also provides control signals and waveforms to transmitter and receiver electronics. An alternate path directs the 8 analog receiver signals into threshold crossing detection circuitry or digital first motion detection, as represented at block 565. This circuitry detects the time of all up or down going threshold crossings. The digitized waveform data and the threshold crossing time data are passed to the surface using telemetry circuitry 590.

In the FIG. 2 embodiment, the processing of signals recorded uphole can be implemented using a processor 170, such as a suitably programmed general purpose digital processor with memory and peripherals conventionally provided. It will be understood, however, that the processing need not be performed at the wellsite, and that signals derived at the wellsite can be processed at a remote location.

Before describing the routine for controlling the processor for operation in accordance with an embodiment of the invention, underlying theory will be set forth. The parametric inversion technique has been previously used for shear seismic and borehole seismic applications to invert the anisotropic parameters (i.e., the characteristic direction and slow/fast slownesses) of subsurface formations. [See e.g. my U.S. Pat. No. 5,214,613.] In this technique, data recorded at an array of M two-component receivers, at some angular frequency $\omega$, are represented in the frequency domain by a parametric model $$\begin{pmatrix} u_1(\omega) \\ u_2(\omega) \\ \vdots \\ u_M(\omega) \end{pmatrix} = \begin{pmatrix} h_f\exp[i\omega s_f z_1] \\ h_f\exp[i\omega s_f z_2] \\ \vdots \\ h_f\exp[i\omega s_f z_M] \end{pmatrix} a_f(\omega) + \begin{pmatrix} h_s\exp[i\omega s_s z_1] \\ h_s\exp[i\omega s_s z_2] \\ \vdots \\ h_s\exp[i\omega s_s z_M] \end{pmatrix} a_s(\omega), \quad (1)$$

where $s_f$, $s_s$, and $a_f(\omega)$, and $a_s(\omega)$ are, respectively, the fast- and slow-shear slownesses and Fourier amplitudes (at frequency $\omega$) of the waveforms respectively, $u_m = (x_m, y_m)^T$ is the two-component modeled data vector at receiver station m, and $h_f = (\cos\theta, -\sin\theta)^T$ and $h_s = (\sin\theta, \cos\theta)^T$ are the fast- and slow-shear polarization vectors. The next step is to find the best set of unknown parameters, $\theta$, $s_f$, $s_s$, $a_f(\omega)$, $a_s(\omega)$, such that this parametric model fits observed data. By choosing a least-squares criterion for fitness, the parameters are estimated by minimizing the squared error $$E = \sum_\omega \sum_{m=1}^M \|u_m(\omega) - d_m(\omega)\|^2. \quad (2)$$

between the model u and the observed data d. The apparent bottleneck in this approach is the number of unknown parameters to be estimated. In particular, the number of Fourier components $a_f(\omega)$ and $a_s(\omega)$ can quickly reach to hundreds, since they are different for each frequency. However, it was shown [C. Esmersoy, Split-Shear Wave Inversion for Fracture Evaluation, SEG Ann. Internat. Meeting Abstracts, pp. 1400–1403, 1990] that the Fourier components can be eliminated from the problem. In other words, the angle $\theta$, and apparent slowness $s_f$, and $s_s$, for each wave (all of which are independent of frequency) can be estimated without knowing the Fourier components. Reference can again be made to my U.S. Pat. No. 5,214,613.

Figure 1:
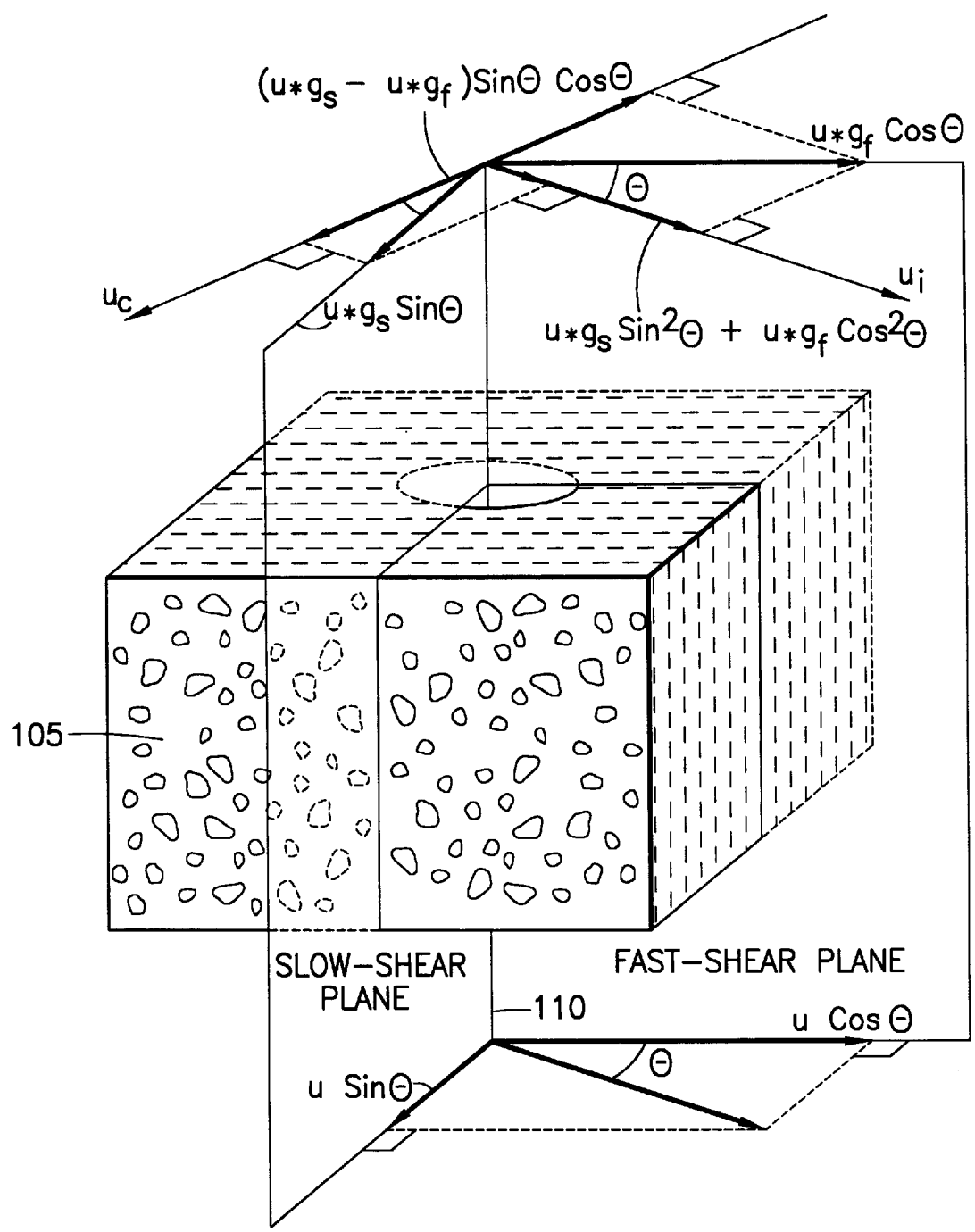
FIG. 1 is a diagram illustrating in-line and cross-components of split-shear/flexural waves for a dipole source oriented at an angle θ from the fast shear direction in an anisotropic medium.
Figure 6:
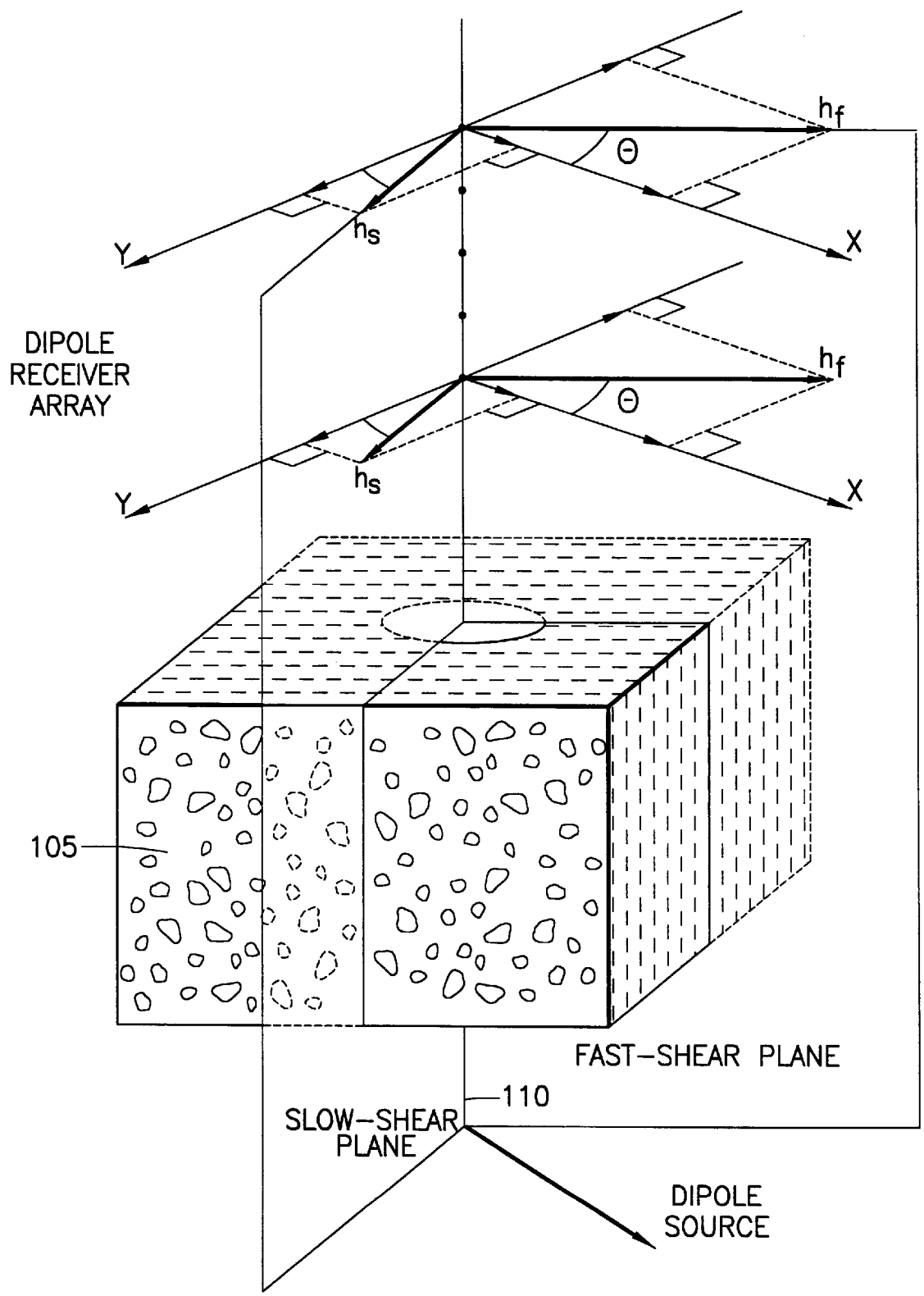
FIG. 6 illustrates the observation of split-flexural waves by an array of dipole receivers in an anisotropic medium and where the x and y components at the receivers are at an angle θ with the fast and slow shear polarization planes.

FIG. 6 shows the recording geometry for observation of split-flexural waves by an array of dipole receivers (represented by the dots on the vertical axis). The reference numerals 105 and 110 correspond to those of FIG. 1. The x and y components of receivers make an angle $\theta$ with the fast- and slow- shear polarization planes in the azimuthal plane. The flexural waves are generated by a dipole source with an arbitrary and unknown azimuthal direction with respect to the polarization planes. For the flexural waves excited using the described type of logging device, it is known that there is wave dispersion; that is, variation of the slowness parameters with frequency. In the present invention, the parametric inversion considers wave dispersion, and the technique is not limited to narrow band operation. Signals recorded at an array of M dipole receivers, at some angular frequency $\omega$, are represented in the frequency domain by the parametric model $$\begin{pmatrix} u_1(\omega) \\ u_2(\omega) \\ \vdots \\ u_M(\omega) \end{pmatrix} = \begin{pmatrix} h_f\exp[i\omega p_f(\omega)z_1] \\ h_f\exp[i\omega p_f(\omega)z_2] \\ \vdots \\ h_f\exp[i\omega p_f(\omega)z_M] \end{pmatrix} a_f(\omega) + \begin{pmatrix} h_s\exp[i\omega p_s(\omega)z_1] \\ h_s\exp[i\omega p_s(\omega)z_2] \\ \vdots \\ h_s\exp[i\omega p_s(\omega)z_M] \end{pmatrix} a_s(\omega), \quad (3)$$

where $h_f = (\cos\theta, -\sin\theta)^T$ and $h_s = (\sin\theta, \cos\theta)^T$ are the fast- and slow-shear polarization vectors where the two elements in the vectors represent the x and y directions indicated in FIG. 6. Comparing equations (1) and (3), the frequency independent, fast/slow shear slowness $s_f$, $s_s$ in (1) are replaced by the phase slowness dispersion functions $p_f(\omega)$ and $p_s(\omega)$ which are dependent on frequency.

The best set of unknowns, $\theta$, $p_f(\omega)$ and $p_s(\omega)$ is sought such that this parametric model fits observed data using some measure of fitness. The functional dependency of the slowness function p() on its parameters is assumed known. This may be given in analytical form, exact or with approximations, or it can be obtained numerically and stored in tables. For example, one simple analytical form can be obtained by approximating the dispersion curve in a frequency band with a line. A similar approach to estimate the dispersion curves of flexural waves is shown in K. Hsu, and C. Esmersoy, Parametric Estimation of Phase and Group Slowness From Sonic Logging Waveforms, Geophysics, 57, No. 8, 978–985, 1992. Using the Taylor series expansion, the phase slownesses around frequency $\omega_0$ can be approximated by the two parameter model, $$p(\omega) \approx p_0 + (\omega - \omega_0)q_0, \quad (4)$$

where $p_o = p(\omega_0)$ is the phase slowness at $\omega_0$, and $$\omega_0 q_0 = \left[ \omega \frac{\partial p(\omega)}{\partial \omega} \right]_{\omega=\omega_0} = g(\omega_0) - p(\omega_0)$$

is the difference between the group and phase slownesses (i.e., amount of dispersion), at $\omega_0$.

By choosing the least-squares criterion for fitness, the parameters are estimated by minimizing the squared error $$\min_{\theta, p_{f0}, q_{f0}, p_{s0}, q_{s0}} E = \sum_\omega \sum_{m=1}^M \min_{\theta, p_{r0}, q_{r0}, p_{s0}, q_{s0}} \|u_m(\omega) - d_m(\omega)\|^2, \quad (5)$$

between the model u and the observed data d. As described before, the Fourier components $a_f(\omega)$ and $a_s(\omega)$ can be eliminated from the minimization problem by substitution, and the above squared error is minimized over the remaining five parameters.

In its simplest form, the model for dipole-shear waveforms in an anisotropic medium consists of one fast and one slow flexural wave. It has been shown [B. Sinha, A. Norris, and S. Chang, Borehole Flexural Modes in Anisotropic Formations, Geophysics, 59, 1037–1052, 1994] that for flexural wave propagation, the anisotropic medium can be adequately represented by two effective isotropic media; one for fast and another for the slow waves. Therefore, we can use the dispersion function for an isotropic medium, which has fewer parameters, to represent p().

The phase slowness functions of these waves, in general, depends on many formation and borehole parameters and it can be complex valued due to attenuation. However, using some assumptions and approximations the number of parameters can be reduced. The flexural dispersion curve for an elastic, isotropic medium and circular borehole depends on five parameters [A. Kurkjian, and S. Chang, Acoustic Multipole Sources In Fluid-Filled Boreholes, Geophysics, 51,148–163, 1986; U.S. Pat. No. 5,278,805]; the shear and compressional slownesses of the formation, the slowness of the mud, the formation to mud density ratio, and the borehole diameter. In the simplest case it can be assumed that all the other parameters are known and the flexural dispersion curves (both for slow and fast waves) can be parameterized with only the shear slowness. For the simplest case, the model is given by $$\begin{pmatrix} u_1(\omega) \\ u_2(\omega) \\ \cdot \\ \cdot \\ \cdot \\ u_M(\omega) \end{pmatrix} = \begin{pmatrix} h_f \exp[i\omega p(s_f,\omega) z_1] \\ h_f \exp[i\omega p(s_f,\omega) z_2] \\ \cdot \\ \cdot \\ \cdot \\ h_f \exp[i\omega p(s_f,\omega) z_M] \end{pmatrix} a_f(\omega) + \begin{pmatrix} h_s \exp[i\omega p(s_s,\omega) z_1] \\ h_s \exp[i\omega p(s_s,\omega) z_2] \\ \cdot \\ \cdot \\ \cdot \\ h_s \exp[i\omega p(s_s,\omega) z_M] \end{pmatrix} a_s(\omega), \quad (6)$$

where the flexural phase slowness dispersion $p(s,\omega)$ is a known function (either analytical or numerically computed and stored) parameterized by the slowness s. After the elimination of the waveform Fourier components [C. Esmersoy, Split-Shear Wave Inversion for Fracture Evaluation, SEG Ann. Internat. Meeting Abstracts, pp. 1400–1403, 1990], the inversion problem becomes the estimation of three parameters; the fast-flexural polarization angle $\theta$, and the fast- and slow shear- slowness $s_f$ and $s_s$ by solving $$\min_{\theta, s_f, s_s} \sum_\omega \sum_{m=1}^M \|u_m(\theta, s_f, s_s, \omega) - d_m(\omega)\|^2. \quad (7)$$

An advantage of the parametric inversion technique is that it minimally requires only a one-component source and two-component receivers. Inline and cross component data from a single dipole source is sufficient for inversion. Of course, further source and/or receiver data permits determination of more unknowns and/or increase in the degree of over determination. Further advantages are that additional sources need not be at the same position as the first source and need not have identical characteristics.

Data recorded at an array of M dipole receivers, at some angular frequency $\omega$, given in equation (3), can be written by using more comprehensive parametric models for flexural wave propagation.

$$\begin{pmatrix} u_1(\omega) \\ u_2(\omega) \\ \cdot \\ \cdot \\ \cdot \\ u_M(\omega) \end{pmatrix} = \begin{pmatrix} h_f \exp[i\omega c(s_f,\omega,\alpha) z_1] \\ h_f \exp[i\omega c(s_f,\omega,\alpha) z_2] \\ \cdot \\ \cdot \\ \cdot \\ h_f \exp[i\omega c(s_f,\omega,\alpha) z_M] \end{pmatrix} a_f(\omega) + \begin{pmatrix} h_s \exp[i\omega c(s_s,\omega,\alpha) z_1] \\ h_s \exp[i\omega c(s_s,\omega,\alpha) z_2] \\ \cdot \\ \cdot \\ \cdot \\ h_s \exp[i\omega c(s_s,\omega,\alpha) z_M] \end{pmatrix} a_s(\omega) \quad (8)$$

where $c(s_f,\omega,\alpha)$ and $c(s_s,\omega,\alpha)$ are the complex dispersion curves for the fast- and slow-flexural waves for an anisotropic medium characterized by: $s_f$, $s_s$ the fast- and slow-shear slownesses, and $\alpha$ the vector representing all other parameters of the anisotropic medium and borehole such as all elastic constants (Sinha et al., supra), unelastic properties such as attenuation, borehole size and shape, and properties of the borehole fluid. $h_f = (\cos\theta, -\sin\theta)^T$ and $h_s = (\sin\theta, \cos\theta)^T$ are the fast- and slow-shear polarization vectors where the two elements in the vectors represent the x and y directions indicated in FIG. 6. Comparing equations (6) and (8), the real-valued fast/slow phase slowness functions $p(s_f,\omega)$, $p(s_s,\omega)$ in (6) are replaced by the complex slowness functions $c(s_f,\omega,\alpha)$ and $c(s_s,\omega,\alpha)$ which are dependent on the parameter vector $\alpha$ in addition to the fast/slow shear slownesses themselves. The functional dependency of the complex slowness function c() on its parameters is assumed known. This may be given in analytical form, exact or with approximations, or it can be obtained numerically and stored in tables. It is also possible to represent the functional form of c() by a parameterized function and include the unknown parameters in the parameter vector $\alpha$.

As before, the next step is to find the best set of unknown parameters, $\theta, s_f, s_s, \alpha, a_f(\omega), a_s(\omega)$, such that this parametric model fits observed data using some measure of fitness. By choosing a least-squares criterion for fitness, we estimate the parameters by minimizing the squared error $$E = \sum_\omega \sum_{m=1}^M \|u_m(\omega) - d_m(\omega)\|^2, \quad (9)$$

between the model u and the observed data d. As described before, the Fourier components $a_f(\omega)$ and $a_s(\omega)$ can be eliminated from the minimization problem by substitution, and the above squared error is minimized over the remaining parameters.

Equations (1), (3), (6) and (8) represent a superposition of two waves. As described in C. Esmersoy, Split-Shear Wave Inversion for Fracture Evaluation, SEG Ann. Internat. Meeting Abstracts, pp. 1400–1403, 1990, this model can be generalized to include more waves, such as fast and slow direct shear waves, compressional waves, Stoneley waves or any other wave or mode. The model may also include waves that propagate in opposite direction across the receiver array, e.g. due to reflections. These waves would be represented by the same polarization vectors, such as $h_f$, and by the sign-reversed, complex conjugate, dispersion curves, such as $-c^*(s_f,\omega,\alpha)$ FIG. 6, previously referenced, shows the recording geometry for observation of split-flexural waves by an array of dipole receivers. As noted, the flexural waves are generated by a dipole source with an arbitrary and unknown azimuthal direction. If there is more than one dipole source available, this data can still be utilized by the parametric inversion technique in an optimal way without the constraints of other techniques. By dropping $\omega$ and by using bold letters for the data and model vectors, equation (3) or (5) can be represented as $$u = e_f a_f + e_s a_s. \quad (10)$$

This is the model for one dipole source. The model for multiple dipole sources (two or more), is obtained by augmenting the model vector. For example, the augmented model for two sources is given by $$\begin{pmatrix} u^{(1)} \\ u^{(2)} \end{pmatrix} = \begin{pmatrix} e_f & 0 \\ 0 & e_f \end{pmatrix} \begin{pmatrix} a_f^{(1)} \\ a_f^{(2)} \end{pmatrix} + \begin{pmatrix} e_s & 0 \\ 0 & e_s \end{pmatrix} \begin{pmatrix} a_s^{(1)} \\ a_s^{(1)} \end{pmatrix} \quad (11)$$

Note that the model vectors $e_f$ and $e_s$ containing the unknowns $\theta$, $s_f$, and $s_s$ are the same for each source, because the unknowns represent the measured medium independent from the source position or orientation. Therefore, addition of more sources does not add new unknowns but adds new measured data points. As is known in inversion techniques, adding new measurements makes the inversion problem more over determined, resulting in more reliable results. Equation (8) has the same mathematical form as the equations (3) or (5), and the augmented minimization problem is given by $$\min_{\theta, s_f, s_s} \sum_\omega \sum_{l=1}^{L} \sum_{m=1}^{M} \|u_m^{(l)}(\theta, s_f, s_s, \omega) - d_m^{(l)}(\omega)\|^2, \quad (12)$$

where L is the number of sources, and this is solved as described above.

A dipole receiver is usually constructed by differencing the pressures measured at two closely spaced hydrophones, as first shown in FIG. 4. Ideally these hydrophones would be perfectly matched, but in practice the quality of the match can vary between tools and can change in time as the materials age. The parametric inversion technique can be extended to represent such possible mismatches by either representing the model explicitly for the recorded pressures rather than their differences. Data recorded at the mth 2-component receiver station is given by (dropping $\omega$ for brevity)

$$u_m = h_f \exp[\phi_f^m] a_f + h_s \exp[\phi_s^m] a_s, \quad (13)$$

where $\phi^m_f$ and $\phi^m_s$ represent the complex exponents in equations (3) or (5) for the fast and slow waves respectively. From FIG. 4, the x and y components of the vector can be written in terms of the pressure differences by $$\begin{pmatrix} \frac{1}{G_{Am}} A_m - \frac{1}{G_{Cm}} C_m \\ \frac{1}{G_{Bm}} B_m - \frac{1}{G_{Dm}} D_m \end{pmatrix} = \begin{pmatrix} \cos\theta \\ -\sin\theta \end{pmatrix} \exp[\phi_f^m] a_f + \begin{pmatrix} \sin\theta \\ \cos\theta \end{pmatrix} \exp[\phi_s^m] a_s, \quad (14)$$

where $A_m$, $B_m$, $C_m$, and $D_m$ are the measured pressures, and $G_{Am}$, $G_{Bm}$, $G_{Cm}$, and $G_{Dm}$ are the gain factors for individual hydrophones. If the gain responses, as a function of frequency, are given or measured by some means with respect to a reference, then these correction factors (inverses of the gains) are used as known coefficients in the model. If the hydrophone gains are not known, then they can be included explicitly in the model for the individual pressures as $$\begin{pmatrix} A_m \\ C_m \\ B_m \\ D_m \end{pmatrix} = \begin{pmatrix} G_{Am} \cos\theta \\ -G_{Cm} \cos\theta \\ -G_{Bm} \sin\theta \\ G_{Dm} \sin\theta \end{pmatrix} \exp[\phi_f^m] a_f + \begin{pmatrix} G_{Am} \sin\theta \\ -G_{Cm} \sin\theta \\ G_{Bm} \cos\theta \\ -G_{Dm} \cos\theta \end{pmatrix} \exp[\phi_s^m] a_s, \quad (15)$$

These gains are included in the parameter vector $\alpha$ in equation (8) and estimated together with the other unknown quantities by minimizing the fit error.

Figure 7A:
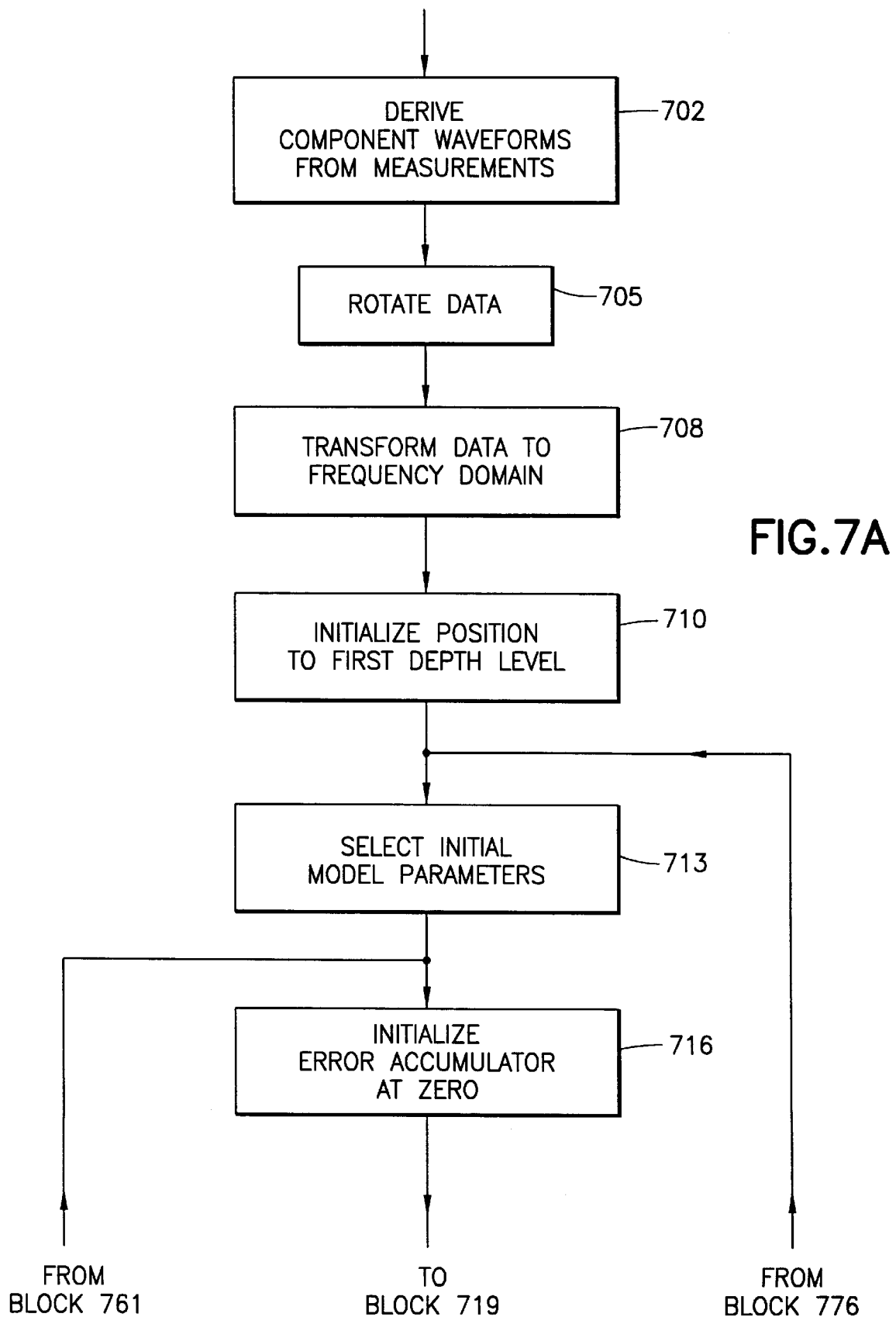
FIG. 7, which includes FIGS. 7A, 7B, and 7C placed one below another, is a flow diagram of a routine for programming a processor in accordance with an embodiment of the invention.
Figure 7B:
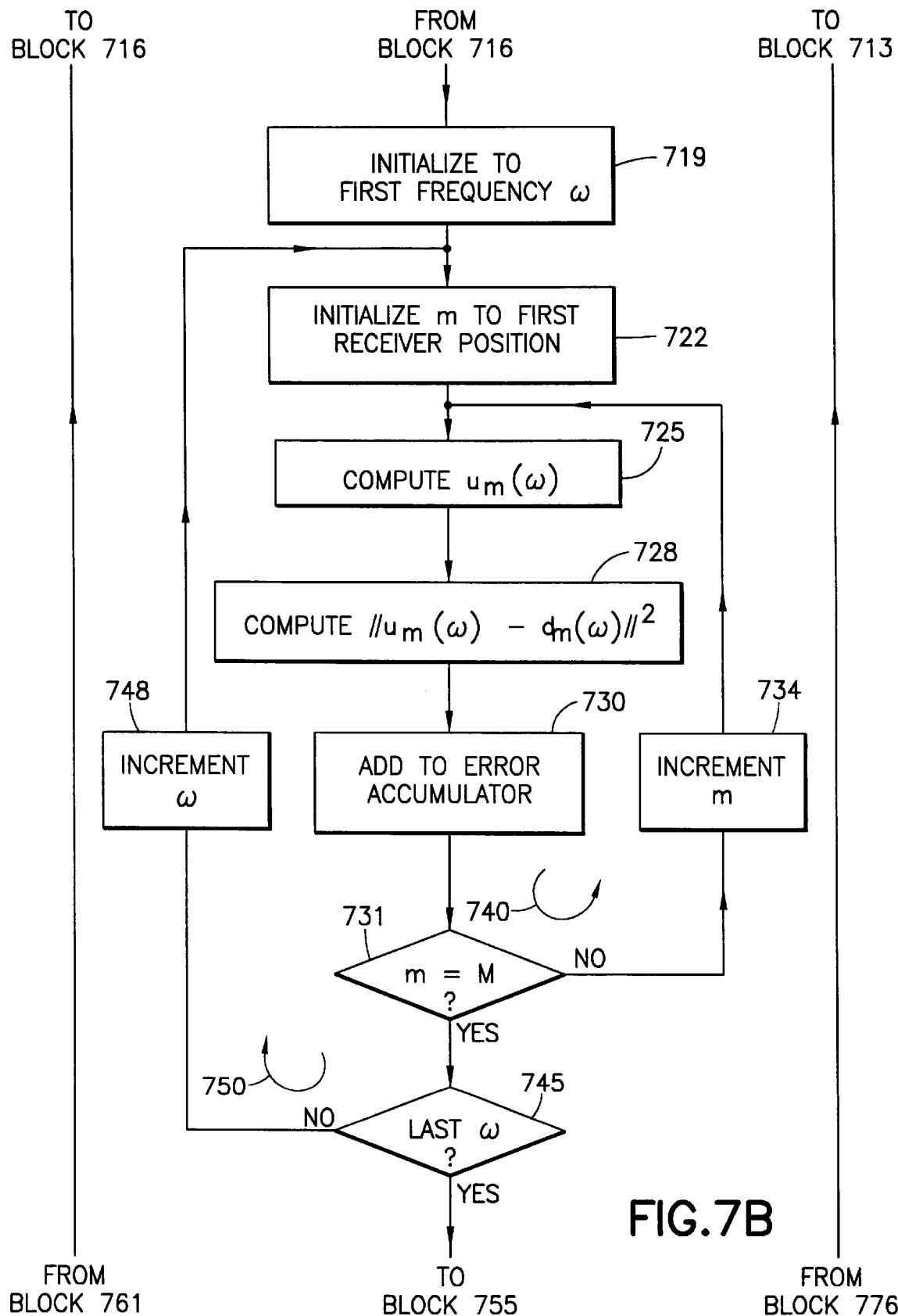
Figure 7C:
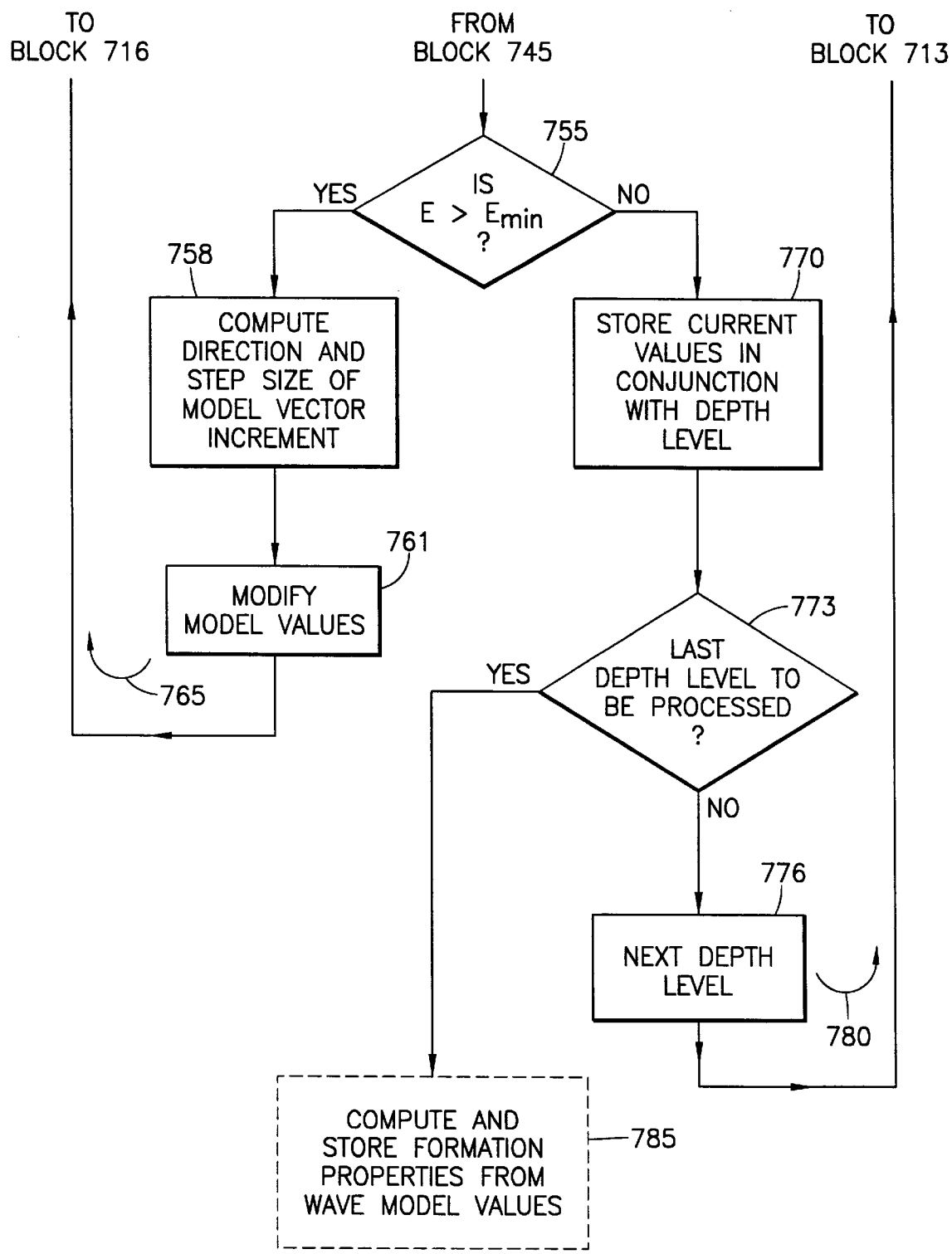

Referring to FIG. 7, there is shown a flow diagram of a routine that can be used for programming the processor 170, or other suitable general or special purpose processor, in accordance with an embodiment of the invention. The block 702 represents the deriving of measurement data taken with the tool (e.g. FIG. 3) over a range of depth levels to be processed. In the present example, the data comprises the previously described two component data taken at the receiver stations (eight of them in this case). Data can be processed in real time, or can be processed after collection and storage. The block 705 represents rotation of the data waveforms, in a manner known in the art, to correct for the tool rotational orientation. Gyro data can be used to implement the necessary corrections. [The rotation at this stage is optional. An alternative is to not rotate the waveforms beforehand, but to later correct the angle $\theta$ determined from the inversion by an angle based on the measured tool rotation orientation. If equation (15) is used, for example, when hydrophone gains are matched, the data waveform rotation cannot be used, and the alternative technique of post-inversion adjustment of $\theta$ can be implemented.] Next, the block 708 represents the transformation of the data from the time domain to the frequency domain. In the present embodiment this is implemented, in the known fashion, using a Fourier transformation technique. A time window of several milliseconds, for example, can be used for the transformation.

The block 710 is then entered, this block representing the initializing to a first depth level to be processed. The block 713 is next entered, this block representing the selection of model values, for the current depth level. In the present example, the angle $\theta$ (which determines the polarization vectors $h_f$ and $h_s$) and the flexural phase slowness dispersion functions $p_f(\omega)$ and $p_s(\omega)$, which are variable functions of frequency. As also described above, these functions can be complex, with real and imaginary parts. As previously described, the flexural dispersion curve for an isotropic medium and a circular borehole depends on several parameters. In one example of the present embodiment, it is assumed that these parameters are known, except the shear slowness for the fast and slow waves (that is, $s_f$ and $s_s$, respectively), so, as in equation (6) above, the flexural dispersion functions are $p(s_f, \omega)$ and $p(s_s, \omega)$, respectively. Accordingly, the selection of model values $s_f$ and $s_s$ determines, at each frequency, $\omega$, the model values $p(s_f, \omega)$ and $p(s_s, \omega)$.

The block 716 is next entered, this block representing the initializing of an error accumulator to zero. As will be described, this accumulator is used in computing the error value E. The frequency, $\omega$, is then initialized at the first Fourier frequency component to be considered (block 719). The number of Fourier frequency components to be used can be selected as a trade-off between accuracy of representation and computation time. In an example hereof, 20 frequencies were employed, although any suitable number can be used. The index m is then initialized to the first receiver position, m=1 (block 722). The values $h_f \exp[\tau \omega p_f(\omega) z_m] a_f(\omega)$ and $h_s \exp[\tau \omega p_s(\omega) z_m] a_s(\omega)$ are then computed and summed, to obtain the model value $u_m(\omega)$ [that is, $u_1(\omega)$ for the first pass]. This is represented by the block 725. For each set of model parameters (for a given frequency), the Fourier components can be obtained, in known manner, by equating the frequency components obtained from the measured waveforms in the depth window with the equations for the model, and solving simultaneously for unknown values of $a_f(\omega)$ and $a_s(\omega)$. Reference can also be made to Esmersoy, P and SV Inversion From Multicomponent Offset VSPs, Geophysics (1990). The error component for the current frequency component, $\omega$, is then computed (block 728), e.g. in accordance with the relationship (5), and this error component is added to the error accumulator (block 730). The quantity $u_m(\omega)$ in the general case will have two orthogonal components (e.g. FIG. 1) and, as is well known, a vector difference (for the frequency component currently being considered) will be the difference between the two-dimensional vector for the measured values [$d_m(\omega)$], and the two-dimensional vector for the model composite wave [$u_m(\omega)$], which was computed above, as represented by block 725. Inquiry is then made (decision diamond 731) as to whether the last receiver position (M) has been reached. If not, m is incremented (block 734), block 725 is re-entered, and the loop 740 is continued as each receiver station is considered and the computed error components are added to the error accumulator. When all receiver positions have been processed, inquiry is made (diamond 745) as to whether all frequency components have been considered. If not, the frequency is incremented (block 748), block 722 is re-entered, and the loop 750 is continued as all frequencies are considered and error components are appropriately accumulated. When the loop 750 is complete, the error, E, in the error accumulator is in accordance with relationship (2).

Inquiry is then made (diamond 755) as to whether E is greater than $E_{min}$. In this embodiment, $E_{min}$ is the error threshold of acceptability, it being understood that other criteria can be utilized. For example, as is well known in parametric inversion techniques, the number of iterations can be kept track of and acceptability can be a function of the number of iterations or the extent of improvement that is obtained. Among other alternatives would be to permit a certain maximum number of iterations. In the present embodiment, if the computed error is above the predetermined threshold, the block 758 is entered, this block representing the computing of the direction and step size of the model vector increment; in other words, the manner in which the model parameters should be incremented or decremented. This type of determination is well known in the art and not, of itself, a novel feature hereof. Reference can be made, for example, to J. E. Dennis et al., Numerical Methods For Unconstrained Optimization And Non-Linear Equations, Prentice Hall (1983), and to suitable known techniques for solution of non-linear least squares problems. The model parameter values (functions) are then appropriately modified (block 761), the block 716 is re-entered, the error accumulator is reset to zero, and the loop 765 continues until the computed error is below the predetermined threshold (or other conditions are indicated, as discussed above). The block 770 is then entered, this block representing the storing of the current model parameter values, that is, at least, $\theta$, $p(s_f, \omega)$ and $p(s_s, \omega)$. Inquiry is then made (diamond 773) as to whether the routine has reached the last depth level to be processed. If not, the position of the depth index is incremented (block 776), block 713 is re-entered, and the loop 780 is continued until all desired depth levels have been processed. Regarding the re-entry to block 713 for selection of initial model values (functions) for the next depth level, it will be understood that the final functions for the previous depth level can be advantageously used for this purpose. [The initial estimates, for the first depth level, can be from indications in the data itself, other data, or arbitrary guesses.] If desired, and as indicated by the optional block 785, formation properties such anisotropy and its direction can be computed in known fashion from the wave model parameter values.

The invention has been described with reference to particular preferred embodiments, but variations within the spirit and scope of the invention will occur to those skilled in the art. For example, although the described embodiment is set forth in terms of wireline logging, it will be understood that the invention can also be applied in logging-while-drilling.

I claim:

1. A method for determining properties of anisotropic formations surrounding an earth borehole, comprising the steps of:

providing a logging device that is moveable through the borehole;

exciting a sonic source at a transmitter location on said logging device to establish flexural waves in the surrounding formations;

measuring at each of a plurality of receiver locations on said logging device, which are spaced at a respective plurality of distances from said transmitter location, orthogonal wave components of split flexural waves that have travelled through said formations;

computing, for each of said plurality of distances and for multiple frequencies, model orthogonal wave components which would result from the superposition of model split-flexural waves having selected model wave parameters including respective fast and slow model slownesses which are variable functions of frequency and model polarizations;

determining an error value which depends on the differences, at each of said plurality of receiver locations, between measured wave components and the model composite waves;

modifying said model parameters;

iteratively repeating said computing, determining, and modifying steps to reduce said error; and storing the ultimately modified model parameters as being indicative of properties of said formations.

2. The method as defined by claim 1, further comprising repeating all steps after the first providing step for different depth levels of said logging device in the borehole, and recording the stored model parameters as a log.

3. The method as defined by claim 1, wherein said modifying of said model parameters comprises modifying said parameters in a vector direction which tends to minimize said error value.

4. The method as defined by claim 1, where said measured wave components are measured as a function of time and transformed to the frequency domain, and said error is determined in the frequency domain.

5. The method as defined by claim 1, wherein said step of exciting a sonic source comprises exciting a dipole source in said logging device.

6. The method as defined by claim 5, further comprising exciting a further dipole source in said logging device, said dipole sources being orthogonally oriented, and further comprising the inclusion of measurements resulting from excitation of said further dipole source in the steps of said method.

7. A method for determining properties of anisotropic formations surrounding an earth borehole, comprising the steps of:

providing a logging device that is moveable through the borehole;

exciting a sonic source at a transmitter location on said logging device to establish flexural waves in the surrounding formations;

measuring at at least one receiver location on said logging device, spaced from said transmitter location, orthogonal wave components of split flexural waves that have travelled through said formations;

computing, for multiple frequencies, model orthogonal wave components which would result from the superposition of model split-flexural waves having selected model wave parameters including respective fast and slow model dispersion functions which are variable functions of frequency and model polarizations;

determining an error value which depends on the differences, between measured wave components and the model composite waves;

modifying said model parameters;

iteratively repeating said computing, determining, and modifying steps to reduce said error; and storing the ultimately modified model parameters as being indicative of properties of said formations.

8. The method as defined by claim 7, wherein said at least one receiver location comprises a plurality of receiver locations spaced at a respective plurality of distances from said transmitter location, and wherein said measuring, computing, and determining steps are performed for each of said plurality of distances.

9. The method as defined by claim 7, wherein said fast and slow model dispersion functions are complex functions.

10. The method as defined by claim 7, wherein said fast and slow model dispersion functions are each complex functions representing shear slowness, elastic properties, and unelastic properties of the formations and the borehole.

11. The method as defined by claim 8, wherein said fast and slow model dispersion functions are each complex functions representing shear slowness, elastic properties, and unelastic properties of the formations and the borehole.

12. The method as defined by claim 10, wherein said unelastic properties include attenuation.

13. The method as defined by claim 7, wherein said orthogonal wave components are each measured using dipole receivers that determine the difference between pressures measured on opposing sides of said logging device.

14. The method as defined by claim 7, wherein said orthogonal wave components are each measured using dipole receivers that determine the wave components as a function of pressures measured on opposing sides of the logging device.

15. The method as defined by claim 7, further comprising repeating all steps after the first providing step for different depth levels of said logging device in the borehole, and recording the stored model parameters as a log.

16. The method as defined by claim 7, wherein said modifying of said model parameters comprises modifying said parameters in a vector direction which tends to minimize said error value.

17. The method as defined by claim 7, where said measured wave components are measured as a function of time and transformed to the frequency domain, and said error is determined in the frequency domain.

18. The method as defined by claim 7, wherein said step of exciting a sonic source comprises exciting a dipole source in said logging device.

19. The method as defined by claim 7, further comprising exciting a further dipole source in said logging device, said dipole sources being orthogonally oriented, and further comprising the inclusion of measurements resulting from excitation of said further dipole source in the steps of said method.

20. Apparatus for determining properties of anisotropic formations surrounding an earth borehole, comprising:

a logging device that is moveable through the borehole;

a sonic source at a transmitter location on said logging device for establishing flexural waves in the surrounding formations;

means for measuring at each of a plurality of receiver locations on said logging device, which are spaced at a respective plurality of distances from said transmitter location, orthogonal wave components of split flexural waves that have travelled through said formations;

means for computing, for each of said plurality of distances and for multiple frequencies, model orthogonal wave components which would result from the superposition of model split-flexural waves having selected model wave parameters including respective fast and slow model slownesses which are variable functions of frequency and model polarizations;

means for determining an error value which depends on the differences, at each of said plurality of receiver locations, between measured wave components and the model composite waves;

means for modifying said model parameters;

means for iteratively repeating said computing, determining, and modifying steps to reduce said error; and means for storing the ultimately modified model parameters which are indicative of properties of said formations.

* * * * *